(12) United States Patent
Oh et al.

(10) Patent No.: US 6,912,911 B2
(45) Date of Patent: Jul. 5, 2005

(54) INDUCTIVELY COUPLED STRESS/STRAIN SENSOR

(76) Inventors: Sung J. Oh, 342 Harshaw Dr., Chester Springs, PA (US) 19425; William J. Biter, 948 Wawaset Rd., Kennett Sq., PA (US) 19348; Stephen M Hess, 300 Baywood Rd., West Chester, PA (US) 19348

( * ) Notice: Subject to any disclaimer, the term of this patent is extended or adjusted under 35 U.S.C. 154(b) by 0 days.

(21) Appl. No.: 10/137,571

(22) Filed: Apr. 30, 2002

(65) Prior Publication Data

US 2003/0200814 A1 Oct. 30, 2003

(51) Int. Cl.[7] .............................................. G01L 1/00
(52) U.S. Cl. ........................................ 73/779; 73/760
(58) Field of Search .................................. 73/779, 760

(56) References Cited

U.S. PATENT DOCUMENTS

| | | | |
|---|---|---|---|
| 3,902,167 A | | 8/1975 | Lutes et al. |
| 4,912,397 A | * | 3/1990 | Gale et al. ................... 324/132 |
| 5,297,439 A | | 3/1994 | Tyren et al. |
| 5,493,921 A | | 2/1996 | Alasafi et al. |
| 5,902,934 A | * | 5/1999 | Sprague et al. ................ 73/779 |
| 5,952,762 A | | 9/1999 | Larsen et al. |
| 5,970,393 A | | 10/1999 | Khorrami et al. |
| 6,026,818 A | | 2/2000 | Blair et al. |
| 6,134,971 A | * | 10/2000 | Misra et al. ................... 73/777 |
| 6,318,189 B1 | * | 11/2001 | Donaldson ............. 73/862.335 |
| 6,490,934 B2 | * | 12/2002 | Garshelis ............... 73/862.336 |
| 6,494,102 B2 | * | 12/2002 | Hanisko ....................... 73/779 |
| 6,494,108 B1 | * | 12/2002 | Van Der Zaag et al. ...................... 73/862.333 |

* cited by examiner

*Primary Examiner*—Edward Lefkowitz
*Assistant Examiner*—Andre Allen

(57) ABSTRACT

An improved method of sensing strain allows measurements of stress, torque, vibration and other loads imposed on a body without physical contact between the body/sensor and the monitoring equipment. An induction loop is at least partially comprised of a magnetostrictive material with a non-linear current-voltage relationship. An excitation device such as a coil is used to induce an AC response in the sensor. The non-linear response to the induced current is received by a sensing device such as a sensing coil, and the output thereof is filtered. The excitation device and sensing device are located in operative proximity to the sensor, but need not be in contact therewith, allowing easy measurement in small spaces, under harsh conditions, or of moving bodies such as drive shafts. The non-linear response of the sensor induces easily detectable harmonics of the base frequency of excitation. These harmonics may advantageously be measured as well.

23 Claims, 4 Drawing Sheets

INDUCTIVELY COUPLED STRESS/STRAIN SENSOR

FIELD OF THE INVENTION

This invention relates generally to stress/strain and torque measurement and more specifically to measurement of stress/strain without physical contact, using a stress/strain/torque sensitive sensor having a non-linear voltage-current relationship.

BACKGROUND OF THE INVENTION

Measurement of stress and strain in various types of bodies is a critical task in numerous fields of engineering. Mechanical, civil, and aeronautical engineers, designers working in many areas and those in charge of monitoring long term status of structures and devices all require the ability to check theoretical calculations of stress or strain against actual measurement of these factors. Machinery, vehicles, buildings, structures, precision equipment, even certain geological structures are all examples of the types of bodies on which stress/strain measuring is used. Despite the existence of well known theories for calculation of stress or strain, measurement remains vital because even in recent decades, computational models of stress and strain have been shown to be incorrect by strain and stress factors which may even exceed the ultimate/design load (working load times the factor of safety) originally provided. In addition, even when such models are correct, decisions made at the time of manufacture or construction may alter the factor of safety in unforseen ways, occasionally with tragic consequences. Finally, during the life cycle of such bodies, fatigue and other alterations in the structure's composition, the history of use of the body or other changes may change the stress or strain of the body.

For purposes of this application, the word "stress" will be used to refer to either stress or strain. While stress may be thought of as the imposed load on a cross-sectional unit area of a body and strain may be considered to be the imposed longitudinal deformation on the body, stress and strain are related by the material's modulus of elasticity (Young's Modulus) and thus for a material of known properties, one may be derived from the other.

This fact is used in the typical stress/strain sensor. Traditional sensors are simply devices (such as wires) firmly attached to the body to be measured, so that elongation of the body results in elongation of the sensor. The elongation per unit length of the sensor (the strain) may then be related to the stress in the body. However such sensors typically require an electronic connection to the measuring apparatus being used to record the measured strain/stress. Wires may be used, or telemetry, but some sort of apparatus beyond the sensor itself is necessary in the prior art.

For example, measuring torque on a rotating shaft is a complex problem: the rotation of the shaft may make a physical contact impossible; other considerations such as space may make telemetry impossible. Numerous attempts have been made to solve this problem, and the broader problem of remote sensing of strain and stress.

Pending US Utility Patent Application 09/651,806 filed Aug. 30, 2000 by Biter et al, (also inventor of the present invention) and entitled "METHOD OF SENSING STRAIN IN A MATERIAL BY DRIVING AN EMBEDDED MAGNETOELASTIC FILM-COATED WIRE TO SATURATION" teaches a non-linear response in the sensor film-coated wire. However, it does not teach remote magnetic induction of a self-current in the sensor, nor remote sensing of the magnetic field internally generated by the sensor's self-current.

U.S. Pat. No. 3,902,167 issued to Aug. 26, 1975 to Lutes et al for "MAGNETIC THIN FILM SWITCH" and U.S. Pat. No. 4,065,757 issued Dec. 27, 1977 to Kardashian for "THIN FILM PLATED WIRE MAGNETIC SWITCH OF ADJUSTABLE THRESHOLD" (related patents to the same assignee) teach switches wherein a thin film coated wire may generate a pulse when its polarity is reversed in an increased magnetic field of opposite polarity. As the '167 reference states at column 1, lines 46 et seq: "There are important differences between a magnetic sensor and a magnetic switch . . . The output of the magnetic sensor changes continuously . . . the switch, on the other hand, has only two states . . . " Thus switches may not serve as useful prior art to sensors and in addition, various structural features of these two references result. The magnetic field generation means and/or the pulse detector are not remote to the sensing device, there is no magnetic induction of a self-current because the magnetic field is externally applied, there is no discussion of driving the magnetic film to saturation, there is no discussion of measuring highly non-linear components of the response (the "pulses" are merely detected for switching), and there is no teaching of measurement of harmonic or other alternative frequency responses. In addition, the current applied is minuscule, and the wire used is copper-beryllium, having a resistance too high to allow useful spike measurement.

U.S. Pat. No. 5,297,439 issued Mar. 29, 1994 to Tyren et al for "MAGNETOELASTIC STRESS SENSOR", discloses a magneto-elastic element (see FIGS. 5 and FIG. 6 of the '439 patent) having a complex structure and geometry. The system used in the '439 patent allows remote sensing of the resonance frequency created in the magneto-elastic element. However, the '439 patent does not disclose that a harmonic frequency of the basic resonance frequency may be sensed, nor does the '439 patent teach or suggest the use of a simplified sensor having a non-linear current-voltage relationship.

U.S. Pat. No. 5,952,762 issued Sep. 14, 1999 to Larsen et al for "SLIP RING AMPLIFIER" addresses this same area by placing a rotor having an amplifier onto the rotating body, as shown in FIG. 4 of the '762 patent. A stator is fixedly mounted around the rotor; leaf contacts on a slip ring physically provide an electrical connection between the sensor/amplifier mounted on the body/rotor and the stator ring surrounding them. This assemblage is obviously not always practical, given considerations such as space, and the presence of the rotor/stator/slip ring/leaf contact combination may substantially alter the rotation of the body being measured.

U.S. Pat. No. 5,493,921 issued Feb. 27, 1996 to Alasafi et al for "SENSOR FOR NON-CONTACT TORQUE MEASUREMENT ON A SHAFT AS WELL AS A MEASUREMENT LAYER FOR SUCH A SENSOR" teaches (see FIG. 2 of the '921 patent) a coil coaxial to a shaft (not shown in FIG. 2) which is across a narrow air gap from a magneto-strictive measurement layer. This is a fixed installation, once again requiring a large space, and severely impacting the geometry of the body being measured. It does not teach or suggest the use of stress sensors having non-linear current-voltage relationships.

U.S. Pat. No. 5,970,393 issued Oct. 19, 1999 to Khorrami et al for "INTEGRATED MICRO-STRIP ANTENNA APPARATUS AND A SYSTEM UTILIZING THE SAME FOR WIRELESS COMMUNICATIONS FOR SENSING AND ACTUATION PURPOSES" teaches the use of a radio frequency antenna which receives a radio signal, modulates it based upon a piezoelectric substrate and re-radiates it. The system is based upon telemetry.

U.S. Pat. No. 5,902,934 issued May 11, 1999 to Sprague et al for "PHASE MAGNITUDE SIGNAL DETECTOR" uses a phase magnitude technique for measurement of torque, using magnetostrictive materials: materials which change magnetic properties under stress (or change shape in differing magnetic environments). The '934 teaches away from examination of magnitude of voltage-current response in sensing coils and further teaches towards increasing linear response in torque measurement sensors.

U.S. Pat. No. 6,026,818 issued Feb. 22, 2000 to Blair et al for "TAG AND DETECTION DEVICE" comes from the field of medical technology and teaches use of a magnetic "tag" attached to surgical equipment. In the event that a tagged item is accidentally left in a surgical site, it can easily be detected by means of a hand held "interrogation ring."

In many applications, contact between the sensing system and the body monitored is undesirable or impossible. This is the case with shafts rotating within confined spaces, especially when retrofit of the sensing system is necessary. In other applications such as bridges, long term health monitoring is needed, yet wear and damage on sensors may mount quickly if the sensor is properly placed to monitor structural elements in high traffic zones or high weather impact zones. In addition, known non-contact stress measurement systems suffer from a variety of weaknesses including weak signal strength, difficulty of sorting out the signal from noise, power requirements, and so on. For measuring of stress in bodies, it would be desirable to provide non-contact methods and apparatus which provide more accuracy, greater reliability, and allow minimization of equipment and space required.

SUMMARY OF THE INVENTION

General Summary

The present invention provides a simple stress-strain sensor having a non-linear current-voltage relationship, and a sensing system to interrogate the sensor without physical contact, not even between the sensor and a telemetry system. The non-linear current-voltage response of the sensor results in producing higher frequency components of the excitation signal. These higher frequency components are strain sensitive and may be measured, even in the presence of a large excitation signal due to the frequency difference.

Summary in Reference to the Claims

It is one objective of the present invention to teach a method of measuring strain in a body, comprising the steps of: emplacing on such body a strain sensor having a voltage-current relationship which changes with strain applied to such body, positioning a remote magnetic excitation device in operative proximity to the sensor, positioning a remote magnetic sensing device in operative proximity to the sensor, passing a first current through the excitation device, thereby magnetically inducing a second current through the sensor which second current varies with strain applied to such body, measuring with the sensing device the second current, and analyzing the second current as a function of the strain in such body.

It is another objective, aspect and advantage of the present invention to provide and teach a method wherein the first current further comprises an AC current having a first frequency.

It is another objective of the present invention to provide a method wherein the second current further comprises a second frequency component which is a harmonic of the first frequency.

It is another objective of the present invention to provide a method wherein the strain sensor has an inductance which changes with strain.

It is another objective and embodiment of the present invention to provide a method wherein the strain sensor changes its voltage-current relationship with strain.

It is another objective of the present invention to provide a method wherein the strain sensor comprises a wire coated with a magnetostrictive film, the wire having two ends.

It is another objective and embodiment of the present invention to provide a method wherein the strain sensor further comprises at least one induction loop operatively connected to each end of the wire.

It is another objective of the present invention to provide a method of measuring strain in a body, comprising the steps of: emplacing on such body a strain sensor having a non-linear voltage-current relationship which varies with applied strain, positioning a remote magnetic excitation device in operative proximity to the strain sensor, positioning a remote magnetic sensing device in operative proximity to the strain sensor, passing a first current having a first frequency component through the excitation device, thereby inducing magnetically a second current having a second frequency component through the strain sensor, measuring with the sensing device the second current, and analyzing the second current as a function of the strain in such body.

It is another objective of the present invention to provide a method wherein the strain sensor comprises a wire coated with a magnetostrictive film, the wire having two ends.

It is another objective of the present invention to provide a method wherein the strain sensor further comprises at least one induction loop operatively connected to each end of the wire.

It is another objective of the present invention to provide a method wherein the strain sensor changes its voltage-current relationship with applied strain.

It is another objective of the present invention to provide a method wherein the strain sensor changes its voltage-current relationship with applied current.

It is another objective of the present invention to provide a method wherein the second current has a second frequency component different than the first frequency.

It is another objective of the present invention to provide a method wherein the second frequency component is a harmonic of the first frequency.

It is another objective of the present invention to provide a method wherein the strain sensor further comprises an induction loop.

It is another objective of the present invention to provide a method wherein the strain sensor further comprises: a wire having a magnetostrictive coating and two ends, and the induction loop having a gap wherein each of the two ends is operatively connected to the induction loop on opposing sides of the gap.

It is another objective of the present invention to provide a method wherein the first current further comprises an AC current in the frequency range between 0 and 1 MHz, preferably in the range from 500 Hz to 250 kHz, more preferably in the range from 1 to 100 kHz, most preferably approximately 10 kHz.

It is another objective of the present invention to provide a method wherein the strain sensor becomes saturated under applied current and exhibits a non-linear current-voltage relationship.

It is another objective of the present invention to provide a method wherein the excitation device comprises an excitation coil.

It is another objective and advantage of the present invention to provide a method wherein the sensing device comprises a sensing coil.

It is another objective, embodiment and aspect of the present invention to provide apparatus for measuring strain in a body, comprising: a strain sensor emplaced on such body, the strain sensor having a non-linear voltage-current relationship which varies with applied current, a remote excitation device positioned in operative proximity to the strain sensor and driven by a first current so as to induce a magnetic field about the strain sensor, an induction loop, consisting of at least one turn, having a gap wherein each of the two ends is operatively connected to the sensor on opposing ends of the gap, further having a second current induced by the magnetic field, the second current varying with strain applied to the strain sensor, a remote sensing device positioned in operative proximity to the strain sensor able to monitor the second current.

It is another objective of the present invention to provide apparatus wherein the first current has a first frequency component and the second current has a second frequency component.

It is another objective of the present invention to provide apparatus wherein the second frequency component is a harmonic of the first frequency component.

DETAILED DESCRIPTION OF THE DRAWINGS

The present invention teaches that the current-voltage relationship of the sensor may be used to allow remote detection of the stress in a body. Specifically, at higher values of current, the voltage/impedance may "spike", reaching a considerably higher value than the normal linear relationship. This spike may be used to measure stress in the body being measured. In particular, this sharp spike in the voltage/impedance will produce higher frequency signal components which under some circumstances may be easier to detect and use for stress measurement than the original signal.

As used herein, the measurement of strain also refers to the measurement of stress, vibration, torque, and other variables which relate directly to the strain in a body.

Figure 1:
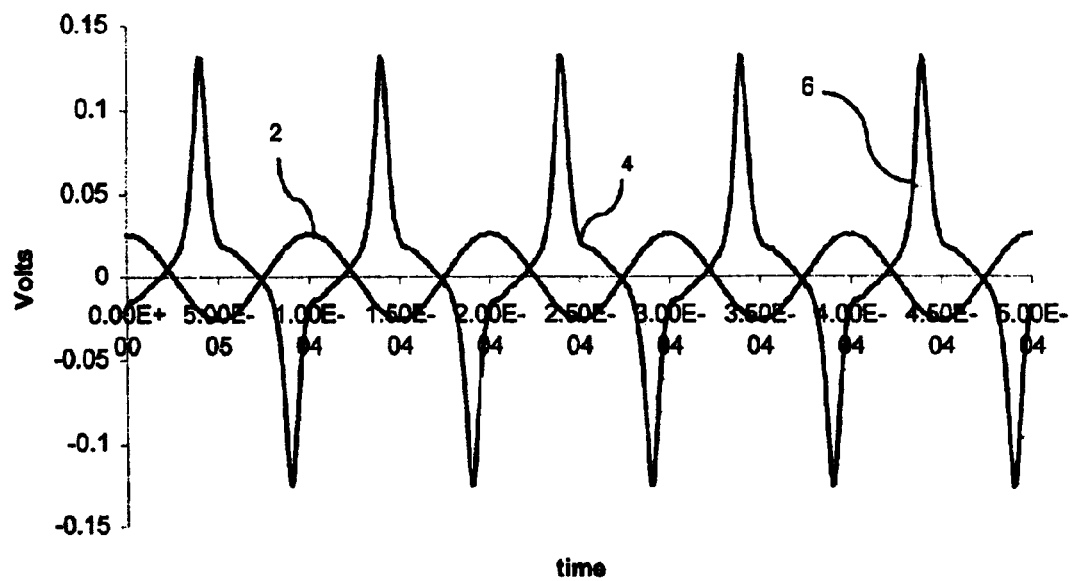
FIG. 1 is a graph showing a non-linear current-voltage relationship.

Referring now to FIG. 1, current 2 is depicted as varying in a sinusoidal fashion (depicted as a cosine wave). Current 2, from a high impedance AC source, drives a sensor wire according to the present invention: one having a non-linear relationship between applied current and voltage. Normally, a linear current to voltage relationship exists: the voltage is a function of applied current and impedance. This is because in most applications, the impedance of a wire is considered to be a constant. However, as depicted in FIG. 1, at low values of current 2, the graph of voltage 4 in the sensor shows that the impedance is not constant. At a certain threshold value of current 2, voltage 4 rises rapidly, indicating that impedance of the sensor is also rising rapidly. As current 2 recuperates below the threshold level, voltage 4 returns to an approximately linear relationship. Without wishing to be bound by any one theory, it is believed that spike 6 represents a hystersis loss of the magnetostrictive coating of the wire.

Note that FIG. 1 also depicts the consistent and repeatable nature of spike 6: at each cycle, spike 6 is depicted to reappear in a consistent manner. Finally, FIG. 1 also shows that spike 6 is frequency dependent, a factor which aids measurement of the response in a manner discussed further later.

Figure 2:
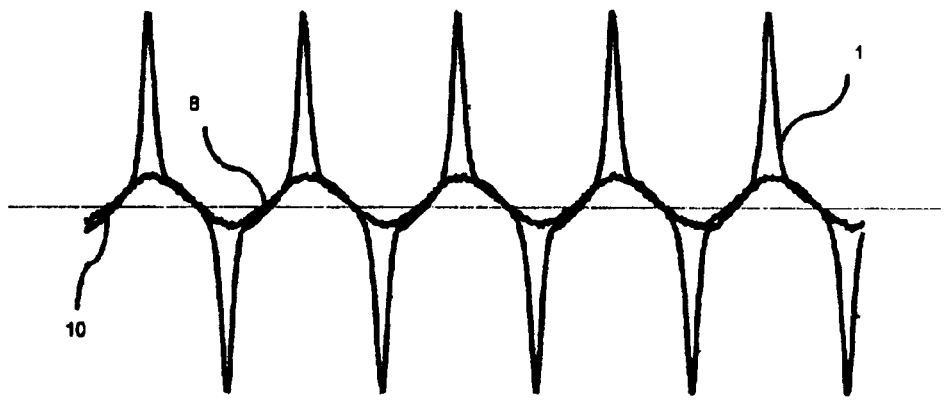
FIG. 2 is a graph showing the effect of stress on output from the sensor.

Without wishing to be bound by any one theory, it is believed that the hystersis loss of the present invention is much more sensitive than the changes of prior art sensors. Thus, when the sensor of the present invention is placed under stress, in FIG. 2 the change in the response with stress as shown by response 10 exhibits the shrinkage of spike 12. The change is considerably more powerful than the change in the normal inductive component.

Figure 3:
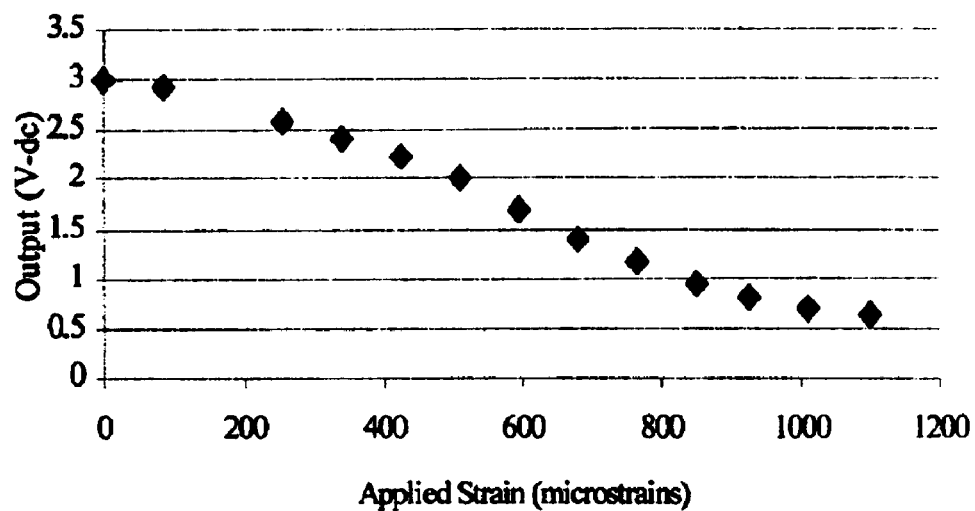
FIG. 3 is a graph showing rms voltage output versus stress of the sensor of the present invention after a high pass filter.

The sensitivity of the sensor may be seen by reference to FIG. 3. The rms (root mean square) output voltage was plotted against applied strain. The sensor was excited using a square wave, the output was sent through a high pass filter which removed frequencies below 50 Khz. As may be seen, at low values of strain from roughly 0.000 to 0.0002, (strain usually being units of length over length, it is effectively dimensionless) rms output voltage is roughly 3 volts. This value drops off until at strain values of approximately 0.001 to 0.0012, the output voltage is less than 1 volt. Naturally, these values are dependent upon the exact details of construction of the sensor.

Figure 4:
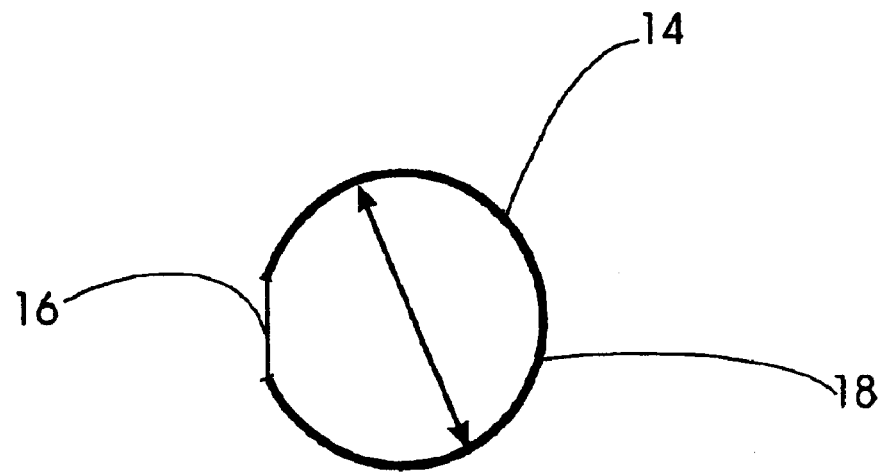
FIG. 4 is a drawing of a first embodiment of the invention.

FIG. 4 shows details of the non-contact sensor of the first embodiment of the present invention. As may be seen, the construction of the sensor requires few components and results in little bulk or mass. Loop 14 may be formed of heavier gauge wire than the sensor wire itself. Loop 14 may consist of 1 loop of wire or multiple loops of wire to increase the induced current for a given value of the applied magnetic field. For proper operation of the sensor, it is necessary that the impedance of the sensor controls the current. As the number of turns increases, the impedance of the loop 14 also increases so the exact design of the sensor and loop structure depends on the construction of the system. Loops from 1 to 20 turns have been successfully used. However, while the incorporated application is directed to the sensor wire 16 the present invention is directed to a remote sensing system using any non-linear response sensor wire, regardless of whether such property is achieved by means of a magnetostrictive coating or by other means. The two ends of sensor wire 16 are operatively connected with (meaning in electrical contact with) induction loop 14, preferably near the ends of the gap, so that current may flow. This is distinct from "operative proximity", which refers to the ability of one device to magnetically induce a current in another device.

For purposes of this application loop 14 is also referred to as an "induction loop" as under excitation, a current is induced through loop 14 and sensor wire 16. Note that the sensor itself does contact the body being measured, however, only this very compact device does so. There is no wiring or telemetry device which is connected to the sensor.

As used herein, the word "emplaced" refers to any method of attaching a sensor to the body being measured which results in the sensor undergoing the same strain as the body, specifically including attachment to the body and embedding within the body. Obviously, if the sensor is merely attached but does not share the strain of the body, no useful measurement is possible. Thus emplacing the sensor is necessary for successful use of the method and apparatus of the present invention.

Diameter 18 of loop 14 is obviously only applicable to those embodiments of the invention in which loop 14 is circular. Loop 14 however is not limited to being circular or circular with a removed chord. Loop 14 may advantageously be elliptical, generally circular, shaped to conform to the body being measured, or any shape necessary for adapting the invention to the desired application. In particular, loop 14 may be omitted in favor of other structures. For example, sensor wire 16 may be held in place by structures of the body being sensed itself, particularly if the stress sensing, strain sensing, torque sensing, vibration sensing or other stress sensing application is long term or integral to the design of the body being measured. In even more particularity, sensor wire 16 may be built into a shaft at the time of manufacture to allow a device such as a vehicle to monitor torque continuously. As another example, loop 14 may advantageously be elliptical, so as to allow it to be placed on a shaft at an angle, for reasons which will be discussed in greater detail later. As yet another example of the alternative embodiments encompassed by the present invention, the sensor may be straight, for embedding within a body. As yet another example, loop 14 may have more than one gap and more than one sensor wire 16.

This first embodiment of the invention is shown in FIG. 4. In order to measure the stress imposed on the first embodiment of the present invention, it is necessary to externally apply a magnetic field to the induction loop and sensor wire. The magnetic field may be generated by means of an alternating current. This externally applied magnetic field induces the required excitation current in the loop. Without wishing to be bound by any one theory, it is believed that the magnetostrictive coating of the sensor wire is driven to saturation. At saturation, the non-linear current-voltage relationship (which may be considered to be an equivalent non-linear current-impedance relationship) causes the spikes 6, 12, explained earlier. Spikes 6, 12 are themselves synchronized with the applied current, however, these high magnitude spikes 6, 12 introduce higher frequency components to the applied field. The most powerful elements of these higher frequency components will tend to be harmonics of the base frequency. These harmonics may in turn be detected and measured to provide accurate measurement of stress/strain, vibration, torque, etc.

The magnetic field which drives the sensor wire must be positioned in operative proximity to the sensor wire. Operative proximity is defined to be a proximity which allows the remote excitation device to operate upon the sensor wire by inducing a current therein. This same term may also be used to describe the relationship of the sensor wire and the sensing device used to detect the non-linear (or non-linear and harmonic) response of the sensor wire: the remote sensing device must be at a distance which allows the remote sensing device to be operated upon by the sensor wire, thus allowing the sensing device to measure the non-linear response of the sensor wire.

Figure 5:
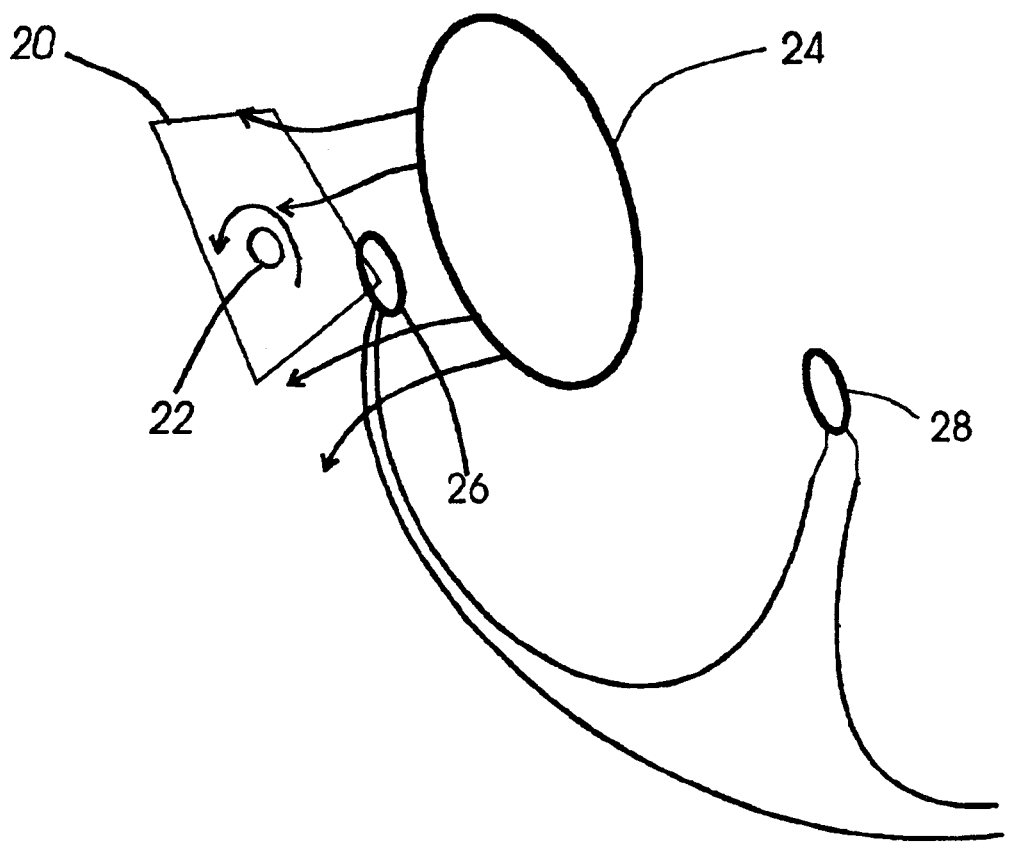
FIG. 5 is a perspective view of a second embodiment of the invention.

FIG. 5 depicts a second embodiment of the present invention. Body 20 has embedded therein sensor 22, which may be a simple loop or multiple loops as described above in reference to the first embodiment of the invention, or may be a straight sensor or other geometry. In the presently preferred embodiment and best mode presently contemplated for carrying out of the invention, sensor 22 is a loop and body 20 is a composite in which stress measurement is desired.

In the second embodiment, remote excitation coil 24 generates a high frequency magnetic field. This high frequency magnetic field is preferably in the frequency range from 10 to 50 KHz. Excitation coil 24 is itself driven by a first current which produces the magnetic field. In other embodiments, presently known or later developed devices equivalent to excitation coil 24 may be employed without departing from the scope of the invention.

The high frequency magnetic field drives sensor 22, inducing a second current therein. Sensor 22 responds with a voltage/impedance spike as earlier described, and the spike in turn produces higher frequency components, including the stronger harmonic components of the current.

The higher frequency components of the current can be detected by a remote sensing device such as remote sensing coil 26. In other embodiments, presently known or later developed devices equivalent to sensing coil 26 may be employed without departing from the scope of the invention.

In one embodiment of the invention, an additional device is employed to null the output voltage from the remote sensing coil 26. It will be understood that sensing coil 26 will be excited by remote excitation coil 24 directly, as well as being subjected to whatever ambient electromagnetic fields are present and the current flowing through the wires connecting the sensing coil to the measurement circuitry. A "bucking coil" 28 may be employed to null the output voltage from the sensing coil 26. Bucking coil 28 operates in a manner identical to sensing coil 26, however, it is arranged in the opposite "handedness" to sensing coil 26, so as to generate equivalent signals of the opposite polarity.

Bucking coil 28 should be placed so as to be subjected to the same electromagnetic fields as sensing coil 26, such as being operatively proximate to remote excitation coil 24, however, bucking coil 28 should not be in operative proximity to sensor 22. Thus, bucking coil 28 will null all signals or as many signals as possible, except those generated by sensor 22. Use of bucking coil 28 is optional. Bucking coil 28 will reduce the undesired portions of the signal but retains the desired frequency returned: the harmonic or higher frequency response. This new and different frequency can be easily recovered by means of a simple high pass filter or by more sensitive techniques such as phase synchronous demodulation techniques, which can extract the strain sensitive signal even in the presence of the very large excitation signal. Other appropriate filtering and/or signal processing may produce the same effect using appropriate analog circuitry, digital circuitry, and/or software; such equivalents are not beyond the scope of the present invention.

These additional coils such as remote excitation coils, remote sensing coils, and bucking coils may be multi-turn coils; they may have any of a range of values for number of coils, size, flux, etc.

It is possible to use an AC excitation current in a range from 0 to 1 MHz, or to use a DC current when measuring strain in a rotating or reciprocating part and to allow the rotation/motion of the shaft to provide an induced AC current.

A flux concentrator may be optionally used in conjunction with any of the coils previously mentioned. In particular, in one alternative embodiment, a flux concentrator is used within the loop of remote sensing device 22. By means of such flux concentrators, more powerful current responses may be induced by a given value of magnetic flux.

EXAMPLE I

Figure 6:
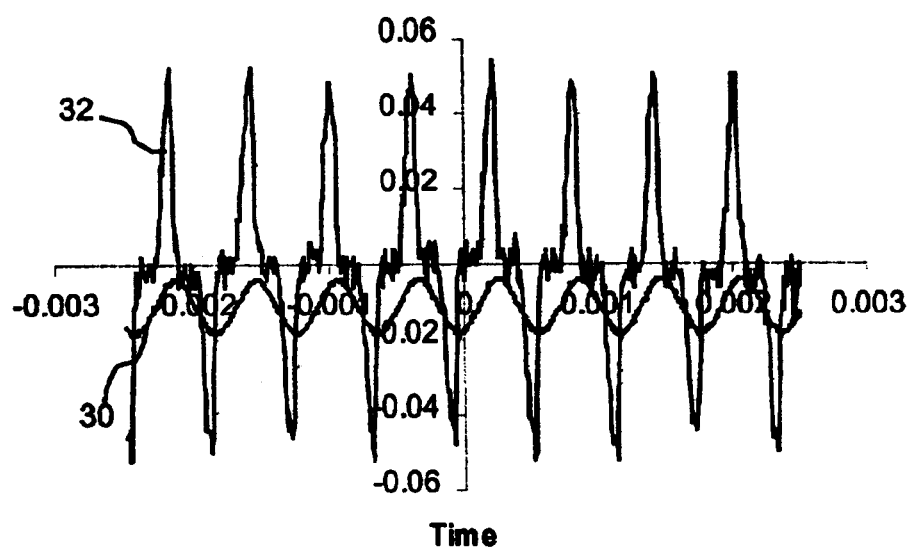
FIG. 6 is a graph of Example 1, comparing the output from the sensor when stressed and unstressed.

FIG. 6 shows uncalibrated data generated by means of an alternative embodiment of the present invention. The alternative embodiment is identical to the second embodiment previously described without the use of bucking coil 28. Sensor 22 is made using a 1 centimeter length of #30 wire, a flux concentrator was used within the loop of the sensor 22. The output was digitized and a simple signal processing algorithm used to subtract the excitation frequency from the signal.

Stressed signal 30 displays a normal cosinusoidal AC waveform. Zero load signal 32, however, displays the effects of the non-linear sensor response and the digital subtraction of the base frequency. As may be seen, the difference between zero load signal 32 and stressed signal 30 is quite significant; this difference allows the invention to function as an efficient stress sensor.

EXAMPLE II

Figure 7:
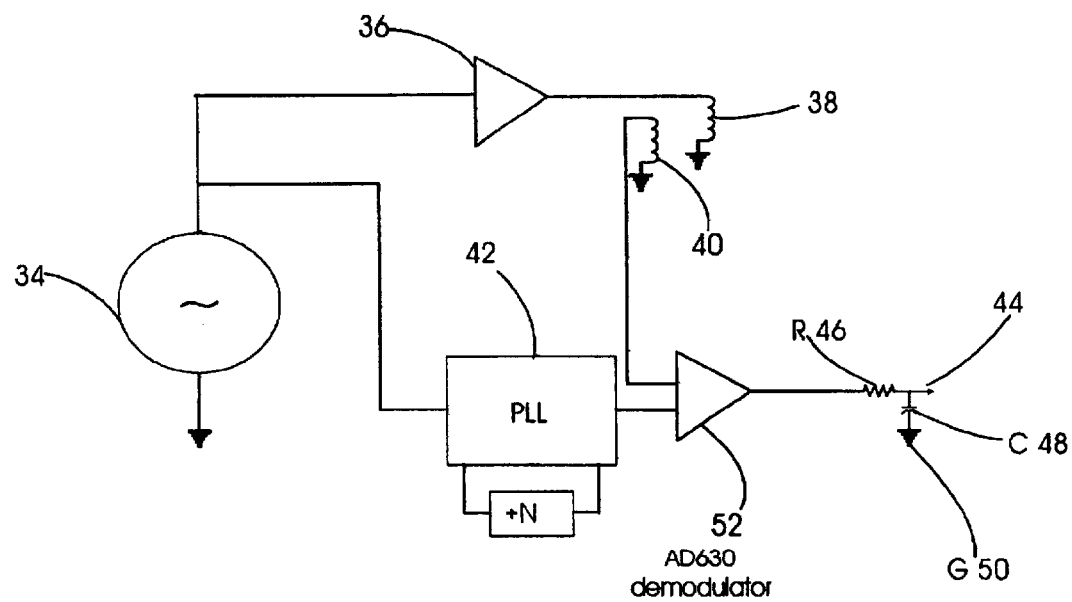
FIG. 7 is a circuit diagram of a third embodiment of the invention showing the circuitry used to drive and monitor the sensor.

FIG. 7 is a circuit diagram of a third embodiment of the invention showing the circuitry used to drive and monitor the sensor. Oscillator 34 generates a 10 kHz base excitation signal. Op amp 36 boosts the power of the 10 KHz excitation signal sent to remote excitation coil 38. Excitation coil 38 is an 80 turn coil in operative proximity to the sensor (not depicted). Sensing coil 40, which is in operative proximity to the sensor (not depicted) receives therefrom the non-linear signal and is a 10 turn coil connected to a demodulator system. The number of turns in each coil is neither fixed to the values above nor optimized; other values are possible.

While the excitation current in Example II is of 10 kHz frequency, the invention is not so limited, and frequencies from 0 to 1 MHz may be used, preferably in the range from 500 Hz to 250 kHz, more preferably in the range from 1 to 100 kHz, most preferably approximately 10 kHz.

The demodulator system comprises PLL 42 (a phase locked loop) which also receives the 10 kHz excitation signal from oscillator 34. PLL 42 generates a desired harmonic of the 10 kHz base signal and feeds it to demodulator 52. Demodulator 52 is in this embodiment a Burr-Brown AD630, however equivalent devices may be used. In Example 2, the third harmonic of the base signal was measured, (the 30 kHz signal) however, numerous harmonics of the base signal may be measured. Demodulator 52 extracts the desired harmonic from the base signal and outputs it to LPF 44 (a low pass filter). LPF 44 consists of resistor 46, capacitor 48 and ground 50. Varying the values of resistor 46 and capacitor 48 allows a choice of the cut-off frequency of LPF 44, in Example II, the cut-off frequency is 100 Hz. Cutoff frequency may be altered, depending upon the frequency of the oscillator, the harmonic selected for measurement and other factors.

In Example II, torque is being measured on a ½ inch diameter steel shaft, a size typically used for a ½ horsepower electric motor, which is used to drive the shaft. In this combination, running torque may be approximately 2.5 ft-lb at 1000 rpm and 2 to 4 times this amount at the time the motor is started.

The sensor used was not optimized for the application. The sensor is looped over the shaft with a 45 degree angle between the axis of rotation of the shaft and the normal to the plane of the conic section formed by the loop of the sensor. The induction loop of the sensor comprised a strip of copper foil of 25 micrometer thickness. The remote excitation and sensing coils, of course, are not mounted on the shaft but are in operative proximity to the sensor.

These methods of measurement and analysis of the current flowing in the sensor (as reflected by the current induced in the sensing device) are not the only methods of measurement and analysis which fall within the scope of the present invention.

Figure 8:
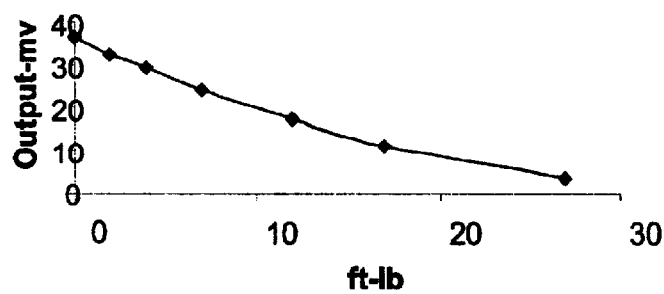
FIG. 8 is a graph of Example 2, showing the output of the sensor under torsional stress when used for torque measurement.

The results of Example II are shown in FIG. 8, showing the output of the sensor when used for torque measurement. Output is rms millivolts. Output dropped smoothly as torque increased, indicating that the sensor system works efficiently.

The 45 degree orientation of the sensor's induction loop on the shaft allows additional measurements to be made beyond torque. In general, while stress, strain and torque have been discussed and measured in the present application, numerous other variables linked to these may be measured, such as vibration, transient shocks, lateral strain (via application of Poisson's Ratio), and acceleration.

This disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A method of measuring strain in a body, comprising the steps of:
    a) emplacing on such body a strain sensor having a voltage-current relationship which changes with strain applied to such body,
    b) positioning a remote magnetic excitation device in operative proximity to the sensor,
    c) positioning a remote magnetic sensing device in operative proximity to the sensor,
    d) passing a first current through the excitation device, thereby magnetically inducing a second current through the sensor which second current varies with strain applied to such body,
    e) measuring with the sensing device the second current, and
    f) analyzing the second current as a function of the strain in such body.

2. The method of claim 1, wherein the first current further comprises an AC current having a first frequency.

3. The method of claim 2, wherein the second current further comprises a second frequency component which is a harmonic of the first frequency.

4. The method of claim 1, wherein the strain sensor has an inductance which changes with strain.

5. The method of claim 1, wherein the strain sensor changes its voltage-current relationship with strain.

6. The method of claim 1, wherein the strain sensor comprises a wire coated with a magnetostrictive film, the wire having two ends.

7. The method of claim 6, wherein the strain sensor further comprises at least one induction loop in electrical contact with each end of the wire.

8. A method of measuring strain in a body, comprising the steps of:
   a) emplacing on such body a strain sensor having a non-linear voltage-current relationship which varies with applied strain,
   b) positioning a remote magnetic excitation device in operative proximity to the strain sensor,
   c) positioning a remote magnetic sensing device in operative proximity to the strain sensor,
   d) passing a first current having a first frequency component through the excitation device, thereby inducing magnetically a second current having a second frequency component through the strain sensor,
   e) measuring with the sensing device the second current, and
   f) analyzing the second current as a function of the strain in such body.

9. The method of claim 8, wherein the step of emplacing on such body a strain sensor having a non-linear voltage-current relationship which varies with applied strain, further comprises:
   using as such strain sensor a wire having two ends and a coating of a magnetostrictive film.

10. The method of claim 9, wherein the step of using as such strain sensor a wire having two ends and a coating of a magnetostrictive film further comprises:
   operatively connecting at least one induction loop to each end of the wire.

11. The method of claim 8, wherein the strain sensor changes its voltage-current relationship with applied strain.

12. The method of claim 8, wherein the strain sensor changes its voltage-current relationship with applied current.

13. The method of claim 8, wherein the step of inducing magnetically a second current having a second frequency component through the strain sensor further comprises: inducing the second frequency component to be different than the first frequency component.

14. The method of claim 13, wherein the step of inducing the second frequency component to be different than the first frequency component further comprises:
   inducing the second frequency component to be a harmonic of the first frequency component.

15. The method of claim 8, wherein the step of emplacing on such body a strain sensor having a non-linear voltage-current relationship which varies with applied strain further comprises:
   providing the strain sensor with an induction loop.

16. The method of claim 15, wherein the step of emplacing on such body a strain sensor having a non-linear voltage-current relationship which varies with applied strain, further comprises:
   using as such strain sensor a wire having a magnetostrictive film and two ends, and wherein the step of providing the strain sensor with an induction loop further comprises providing the induction loop with a gap and operatively connecting each of the two ends to opposing sides of the gap.

17. The method of claim 8, wherein the step of passing a first current having a first frequency component through the excitation device further comprises:
   providing the first current with a frequency in the range between 0 and 1 MHz, preferably in the range from 500 Hz to 250 kHz, more preferably in the range from 1 to 100 kHz, most preferably approximately 10 kHz.

18. The method of claim 8, further comprising the step of
   saturating the strain sensor under the applied current whereby the strain sensor exhibits a non-linear current-voltage relationship.

19. The method of claim 8, wherein the step of providing an excitation device further comprises:
   providing the excitation device in the form of an excitation coil.

20. The method of claim 8, wherein the step of providing a sensing device further comprises:
   providing the sensing device in the form of a sensing coil.

21. Apparatus for measuring strain in a body, comprising:
   a) a strain sensor emplaced on such body, the strain sensor having a non-linear voltage-current relationship which varies with applied current,
   b) a remote excitation device positioned in operative proximity to the strain sensor and driven by a first current so as to induce a magnetic field about the strain sensor,
   c) an induction loop, consisting of at least one turn, having a gap wherein each of the two ends is operatively connected to the sensor on opposing ends of the gap, further having a second current induced by the magnetic field, the second current varying with strain applied to the strain sensor,
   d) a remote sensing device positioned in operative proximity to the strain sensor able to monitor the second current.

22. The apparatus of claim 21, wherein the first current has a first frequency component and the second current has a second frequency component.

23. The apparatus of claim 22, wherein the second frequency component is a harmonic of the first frequency component.

* * * * *